United States Patent [19]

Lee

[11] Patent Number: 4,962,898
[45] Date of Patent: Oct. 16, 1990

[54] VIDEO TAPE CASSETTE

[75] Inventor: Jung Kwan Lee, Chunan, Rep. of Korea

[73] Assignee: SKC Limited, Seoul, Rep. of Korea

[21] Appl. No.: 353,888

[22] Filed: May 18, 1989

[30] Foreign Application Priority Data

May 20, 1988 [KR] Rep. of Korea ............. 88-7522

[51] Int. Cl.$^5$ ................................. G11B 23/04
[52] U.S. Cl. ........................... 242/199; 242/197; 360/132
[58] Field of Search ............... 242/197, 199; 360/132; 403/289, 290, 341, 361

[56] References Cited

U.S. PATENT DOCUMENTS

| 3,910,692 | 10/1975 | Scibilia | 242/199 X |
| 3,991,956 | 11/1976 | Machida | 242/199 |
| 3,995,790 | 12/1976 | Kelch et al. | 242/199 |
| 4,168,043 | 9/1979 | Shiba | 242/199 |
| 4,371,131 | 2/1983 | Okamura et al. | 242/199 |
| 4,558,387 | 12/1985 | Shiba et al. | 360/132 |
| 4,674,703 | 6/1987 | Falk | 242/199 |
| 4,756,490 | 7/1988 | Newell | 242/199 |

FOREIGN PATENT DOCUMENTS

| 0150987 | 8/1985 | European Pat. Off. | 360/132 |
| 0168979 | 9/1984 | Japan | 360/132 |

Primary Examiner—Daniel P. Stodola
Assistant Examiner—Joseph Rhoa
Attorney, Agent, or Firm—Kramer, Brufsky & Cifelli

[57] ABSTRACT

A video tape cassette includes half up and half down assembled plates. The plates are secured with a boss having a supporting bar connected to the half down plate. An insertion tube, connected to the half up plate is disposed about the supporting bar and a tubular tape guide is disposed over the boss to force press the insertion tube against the boss so as to secure the tape cassette. In other embodiments, a wedge is disposed within the boss to expand the insertion tube so as to securely assemble the tape cassette.

3 Claims, 2 Drawing Sheets

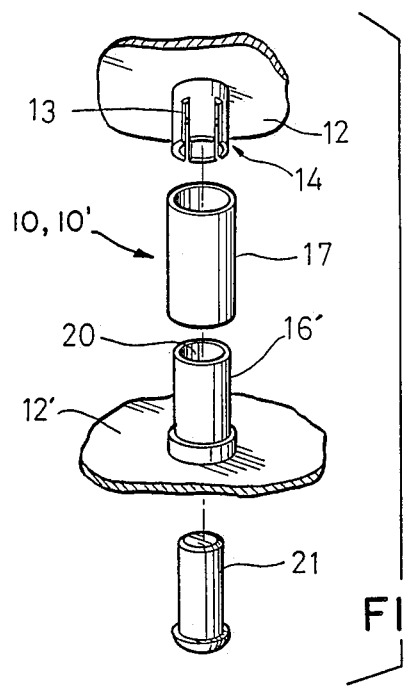
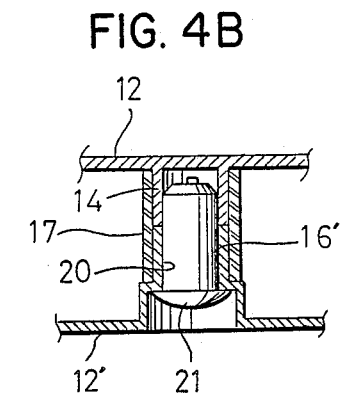
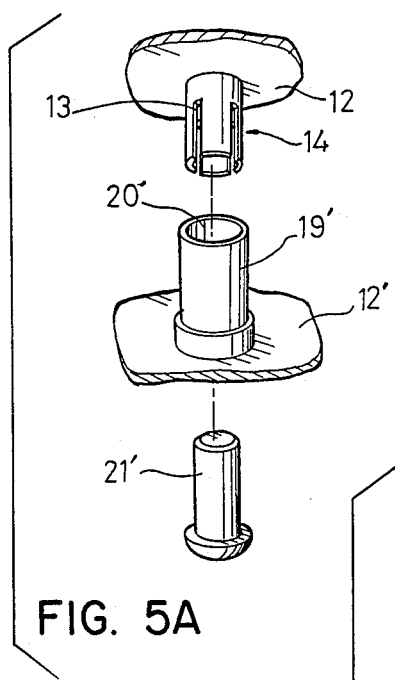
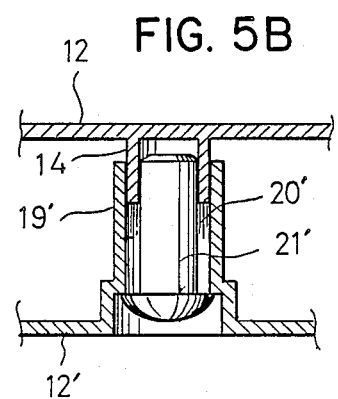
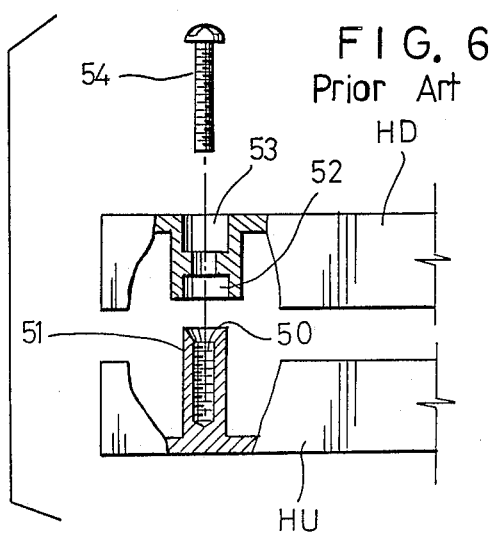

VIDEO TAPE CASSETTE

The present invention relates to a video tape cassette. It aims to obtain a video tape cassette which can be conveniently assembled without using screws or other tools.

As is generally known, the video tape cassette is to protect a tape and improve reliability of quality by making it easy to handle and by keeping it untouched. The tape is controlled by its two built-in reels.

As to the prior video tape cassette, it is fixed by a screw (54) after a half up (HU) plate with a boss (51) having a screw hole (50) formed as one body and a half down (HD) plate with a boss support (21) and a screw support (53) formed as one body are united, as illustrated in FIG. 6. Thus, it requires a tool to drive a screw. In a word, its assembly operation is not only troublesome but also time-consuming because screws must be driven one by one.

In view of such a problem, the present invention aims to provide a video tape cassette designed not only to use no screws but also to achieve swift assembly.

Giving an explanation of the present invention according to the drawings attached hereto, it is as follows.

2(B) is a sectional view showing the assembly of (A).

Figure 3A:
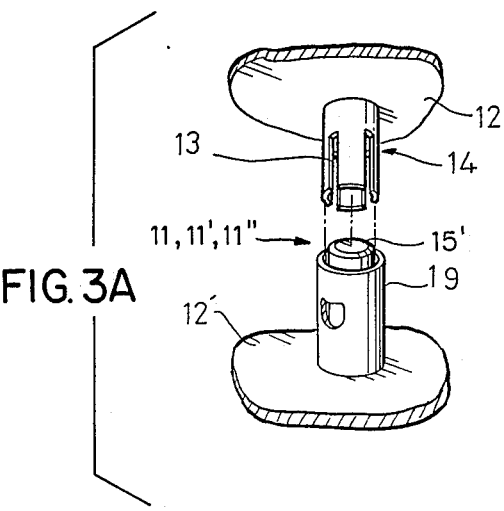

FIG. 3(A) is a separated perspective view of the rear uniting part applied to the present invention.

3(B) is a sectional view showing the assembly of (A).

FIG. 4(A) is a separated perspective view showing another embodiment of the frontal uniting part applied to the present invention.

4(B) is a sectional view showing the assembly of (A).

FIG. 5(A) is a separated perspective view of the rear uniting part applied to the present invention.

5(B) is a sectional view showing the assembly of (A).

FIG. 6 is a disassembled perspective view of the uniting part of cassette heretofore in use.

Figure 1:
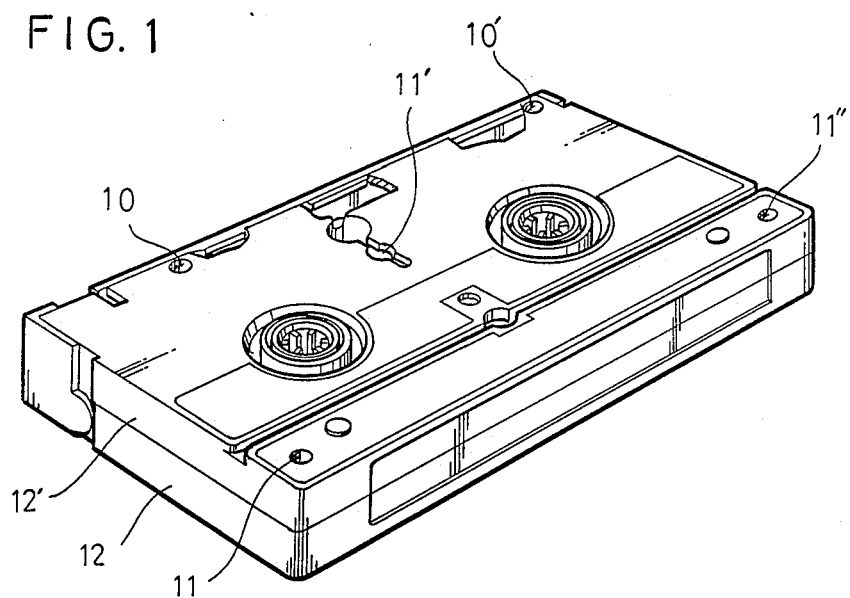
FIG. 1 is a perspective view of video tape cassette.

FIG. 1 shows a perspective view of the general video tape cassette illustrated to make a description of the present invention. It shows frontal uniting parts (10) (10') and rear uniting parts (11) (11') (11'').

Figure 2A:
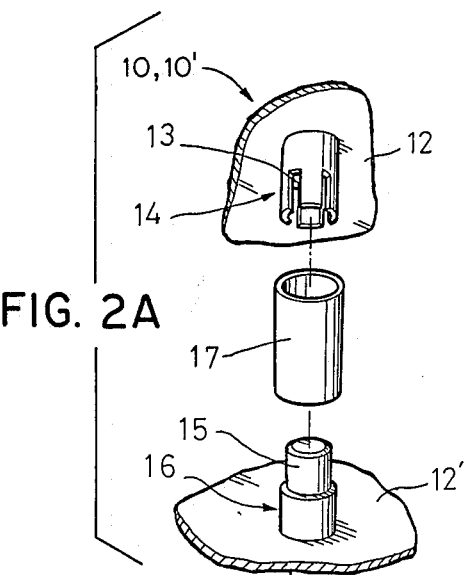
FIG. 2(A) is a separated perspective view of the frontal uniting part applied to the present invention.
Figure 2B:
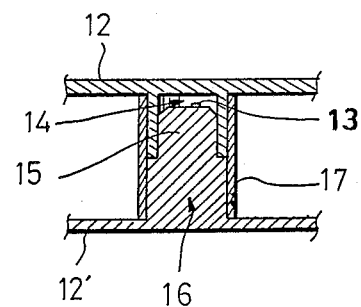

FIG. 2(A) and FIG. 2(B) show the structure of frontal uniting parts (10) (10') which comprises an insertion tube (14) provided with a plurality of incising grooves (13) connected on the side of half up plate (12) and a boss (16) stepped with a supporting bar (15) in its upper part or end connected at its second end on the side of half down plate (12') and enables the said insertion tube (14) to pass over and to be disposed about the said supporting bar (15) stopped against the boss and then a known tubular tape guide (17) to pass over the circumference of the insertion tube and the tubular supporting bar and stopped against the boss. The frontal uniting parts 10 and 10' are essentially identical and therefore both are represented by FIGS. 2(A) and 2(B).

Figure 3B:
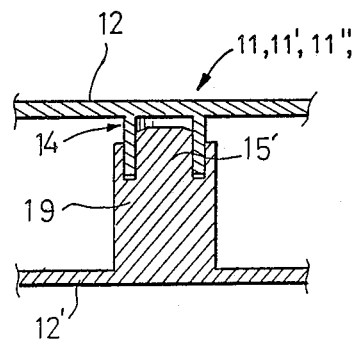

FIG. 3(A) and FIG. 3(B) show the structure of rear uniting parts (11) (11') (11'') which comprises such an insertion tube (14) as stated above on the side of half up plate (12) and, on the side of half down plate (12'), a tubular boss (19) provided with a tubular supporting bar (15') in its center and extending from a first end of the tubular boss to enable the said insertion tube (14) to pass over it and to be fixed there. The rear uniting parts (11) (11') (11'') are essentially identical and therefore are each represented by FIGS. 3(A) and 3(B).

The present invention is an improved version of the former vide tape cassette. It can be assembled not by driving screws but by such forced passing (slipping) method as previously described. Giving an explanation of its operation and effect, it is as follows:

The frontal uniting parts are illustrated in FIG.(A) and 2(B) when the insertion tube (14) formed with a plurality of incising grooves (13) to be flexible on the side of half up plate (12) is pressed down for insertion in a condition where the known tape guide (17) is passed over the circumference of boss (16) on the side of half down plate (12'), it is inserted between the outside of supporting bar (15) and the inside of tape guide (17). However, it is not inserted further when its lower end is caught or stopped by the step of boss (16). Then, it is fixed between the outside of supporting bar (15) and the inside of tape guide (17).

The rear uniting parts are illustrated in FIGS. 3(I) and 3(II). - When the insertion tube (14) on the side of half up formed in the same manner as that of the frontal uniting parts (10) (10') is pressed down for insertion, it is inserted between the outer wall of boss (19) and the supporting bar (15') in its center. Then, it is fixed to the inside of boss (19) by being extended outwardly by the supporting bar inserted into the inside thereof. Thus, assembly can be done easily.

As to another embodiment of the present invention, its frontal parts (10) (10') are designed in the same way as the frontal parts of the present invention, as illustrated in FIGS. 4(A, 4(B).

In other words, an insertion tube (14) on the side of half up plate (12) and a boss (16') on the side of half down plate (12') are formed and a known tubular tape guide (17) is passed over the circumference thereof but a wedge insertion hole (20) is formed by passing it through the inner bottom of boss (16') on the side of half down plate (12') and then the insertion tube (14) is expanded and fixed by driving a wedge (21) therein from the bottom. The rear uniting parts (11) (11') (11'') are also designed in the same manner as the rear uniting parts of the present invention as illustrated in FIG. 5(A), 5(B).

In other words, an insertion tube (14) is formed on the side of half up plate (12) but a wedge insertion hole (20') is formed by passing it through the inner bottom of boss (19') on the side of half down plate (12') and then the insertion tube (14) is fixed by driving a wedge (21') therein from the bottom of the tubular boss.

As previously described, the present invention is a practical and economical device by reason that it not only makes assembly easy by using a forced insertion (passing) method instead of screws heretofore in use, but also curtails the manufacturing cost and improves product reliability.

What is claimed is:

1. A video tape cassette, comprising:
    a half up plate and a half down plate being assembled together to form said tape cassette;
    means for securing said half up plate to said half down plate during their assembly to form the tape cassette; said means for securing including:
    a boss with a supporting bar on a first end, said boss being connected at a second end to said half down plate;
    an insertion tube having a plurality of incising grooves, said insertion tube being connected to said half up plate and disposed about said supporting bar and stopped against said boss; and a tape guide being tubular in shape disposed against said boss to force press the insertion tube against the supporting bar so as to securely assemble the tape cassette.

2. A vide tape cassette, comprising:

a half up plate and a half down plate being assembled together to form said tape cassette;

means for securing said half up plate to said half down plate, said means for securing including:

a tubular boss with a tubular supporting bar extending from a first end of said tubular boss, said tubular boss being connected at a second end to said half down plate;

an insertion tube having a plurality of incising grooves, said insertion tube being connected to said half up plate and stopped against an end of said tubular supporting bar;

a tape guide being tubular in shape disposed over said insertion tube and said tubular supporting bar and stopped against said boss; and a wedge disposed in both said tubular supporting bar and said insertion tube to expand the insertion tube against the tape guide so as to securely assemble the tape cassette.

3. A video tape cassette, comprising:

a half up plate and a half down plate being assembled together to form said tape cassette;

means for securing said half up plate to said half down plate, said means for securing including:

a tubular boss with a tubular supporting bar extending from a first end of said tubular boss, said tubular boss being connected at a second end to said half down plate;

an insertion tube having a plurality of incising grooves, said insertion tube being connected to said half up plate and disposed within said tubular supporting bar;

a wedge disposed in both said tubular supporting bar and said insertion tube to expand the insertion tube against the supporting bar so as to securely assemble the tape cassette.

* * * * *